US010384837B2

(12) United States Patent
Hein et al.

(10) Patent No.: US 10,384,837 B2
(45) Date of Patent: *Aug. 20, 2019

(54) INSULATED CAP (71) Applicant: Helen of Troy Limited, St. Michael (BB)

(72) Inventors: Benjamin Robert Hein, Bend, OR (US); Brian George Goodwin, Bend, OR (US)

(73) Assignee: Helen of Troy Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,338

(22) Filed: Jul. 9, 2018

(65) Prior Publication Data

US 2018/0319549 A1 Nov. 8, 2018

Related U.S. Application Data (63) Continuation of application No. 15/144,667, filed on May 2, 2016, now Pat. No. 10,017,301.

(Continued)

(51) Int. Cl.
*A47J 41/00* (2006.01)
*B65D 41/04* (2006.01)
(Continued)

(52) U.S. Cl.
CPC ....... *B65D 41/0442* (2013.01); *B65D 51/242* (2013.01); *B65D 81/3841* (2013.01); *A47J 41/0011* (2013.01); *A47J 41/0088* (2013.01)

(58) Field of Classification Search
CPC .... A47J 41/02; A47J 41/0005; A47J 41/0088; A47J 41/0011; A47J 41/0072;
(Continued)

(56) References Cited

U.S. PATENT DOCUMENTS 1,426,728 A * 8/1922 Graham ................. B65D 39/04
215/326
1,476,820 A  12/1923 Johnson
(Continued)

FOREIGN PATENT DOCUMENTS

DE       8701412 U1   3/1987
DE     202013105855   1/2014
(Continued)

OTHER PUBLICATIONS

U.S. Receiving Office, International Search Report and Written Opinion of the International Searching Authority in PCT/US2016/030466, dated Oct. 7, 2016, which is an international application of Applicant Helen of Troy Limited that shares the same priority as this U.S. application.

(Continued)

*Primary Examiner* — Gideon R Weinerth (74) *Attorney, Agent, or Firm* — Rankin, Hill & Clark LLP (57) ABSTRACT

Container assemblies including an insulated cap for sealing the mouth of the container, the insulated cap including an outer shell, an insulation block defining a plurality of elongate voids disposed at least partially within the outer shell, a securing element configured to secure the cap to the container, and a sealing member configured to form a seal between the insulated cap and the container when the insulated cap is secured to the container by the securing element.

21 Claims, 4 Drawing Sheets

Related U.S. Application Data (60) Provisional application No. 62/155,356, filed on Apr. 30, 2015.

(51) Int. Cl.
  *B65D 81/38* (2006.01)
  *B65D 51/24* (2006.01)

(58) Field of Classification Search
  CPC .............. A47G 19/2288; B32B 3/12; B32B 2307/304; B32B 2307/732; B65D 41/04; B65D 41/0442; B65D 41/0407; B65D 51/242; B65D 51/24; B65D 81/3841; B65D 81/3846; B65D 81/3869; B65D 25/2894; B65D 2543/0049; B65D 1/0246; B65D 1/0215; B65D 81/38; Y10T 428/24149; Y10T 428/2415; F17C 2201/01; F17C 2201/056; F17C 2201/058; F17C 13/001
  USPC .............. 215/13.1, 277, 305, 355, 364; 220/592.01, 592.16, 592.17, 592.2, 773; 428/71
  See application file for complete search history.

(56) References Cited

U.S. PATENT DOCUMENTS

| | | | |
|---|---|---|---|
| 1,537,786 A | | 5/1925 | Simonson et al. |
| 1,771,123 A | | 7/1930 | Johnson |
| 2,053,252 A | | 9/1936 | Cook et al. |
| 2,207,543 A | | 7/1940 | Knapp |
| 2,418,630 A | * | 4/1947 | Febbraro .............. B65D 51/24 210/514 |
| 2,536,426 A | | 1/1951 | De Oliveira |
| 2,958,442 A | | 11/1960 | Lorentzen |
| 3,016,315 A | | 1/1962 | Robinson |
| 3,017,047 A | | 1/1962 | Payson et al. |
| 3,089,603 A | | 5/1963 | Leslie-Smith |
| 3,096,897 A | | 7/1963 | Hansen |
| 3,220,595 A | | 11/1965 | Edwards |
| 3,556,917 A | | 1/1971 | Eakin et al. |
| 3,984,022 A | * | 10/1976 | Babiol .................. B65D 39/00 215/355 |
| 4,081,720 A | * | 3/1978 | Pfefferkorn ............ B65D 39/04 215/354 |
| 4,162,341 A | | 7/1979 | Norton |
| RE30,768 E | | 10/1981 | Bramming et al. |
| 4,489,840 A | | 12/1984 | De Freitas |
| 4,982,868 A | | 1/1991 | Robbins, III |
| 5,667,135 A | | 9/1997 | Schaefer |
| 6,170,693 B1 | | 1/2001 | Goto |
| 6,971,539 B1 | | 12/2005 | Abbe |
| 8,215,511 B1 | | 7/2012 | Lin |
| 8,646,597 B2 | | 2/2014 | Yang et al. |
| 2002/0130131 A1 | | 9/2002 | Zucker et al. |
| 2005/0042416 A1 | | 2/2005 | Blackmon et al. |
| 2005/0089661 A1 | | 4/2005 | Hogenson et al. |
| 2008/0121607 A1 | * | 5/2008 | Marsollier ......... B65D 39/0029 215/364 |
| 2010/0108694 A1 | | 5/2010 | Sedlbauer et al. |
| 2011/0220664 A1 | | 9/2011 | Sant |
| 2011/0259895 A1 | | 10/2011 | Parenteau et al. |
| 2012/0031957 A1 | | 2/2012 | Whitaker |
| 2012/0325836 A1 | | 12/2012 | Nenniger |
| 2015/0158656 A1 | | 6/2015 | McKinnon |
| 2015/0197390 A1 | | 7/2015 | Kurabe et al. |
| 2015/0232232 A1 | | 8/2015 | Shibuki et al. |
| 2016/0192797 A1 | * | 7/2016 | Yang .................. A47G 19/2288 220/592.17 |
| 2017/0240338 A1 | * | 8/2017 | Wendt ..................... A47J 41/00 |

FOREIGN PATENT DOCUMENTS

| | | |
|---|---|---|
| FR | 2652570 A1 | 4/1991 |
| WO | 0168477 A1 | 9/2001 |
| WO | 2013181455 A1 | 12/2013 |

OTHER PUBLICATIONS

U.S. Patent and Trademark Office, Office action in U.S. Appl. No. 15/144,667, dated Sep. 15, 2017, which is another application of Applicant Helen of Troy Limited that shares the same priority as this U.S. application.

Supplementary EP Search Report filed in EP 16787312 dated Nov. 28, 2018.

* cited by examiner

INSULATED CAP

TECHNICAL FIELD

This disclosure relates to thermally insulated containers for liquids, and more specifically to thermally insulated caps for such thermally insulated containers.

INTRODUCTION

When a need exists to store or transport a substance, and it is furthermore desirable to keep that substance at temperature that is either higher or lower than ambient temperature, the solution is typically an insulated container. Insulated containers are available in a vast number of configurations depending upon the substance to be transported and the temperatures to be maintained, from the thermal bags used to deliver hot pizzas to the cryogenic storage dewars used to hold cryogens such as liquefied gases.

Of particular utility are beverage containers, such as water bottles or sports bottles, that are typically used to contain beverages that are either colder (such as ice water) or hotter (such as coffee) than ambient temperatures. To maintain such beverages at their desired temperature for a desired amount of time, such containers typically contain insulating structures and/or materials.

SUMMARY

The present disclosure is directed to insulated caps, assemblies of containers and insulated caps, and methods of manufacturing insulated caps.

In one aspect, the disclosure is directed to a lid for sealing a mouth of a container, the lid including: an outer shell; an insulation block disposed within the outer shell, wherein the insulation block defines a plurality of elongate hexagonal voids; and a sealing member configured to form a seal between the lid and the container when the lid is secured to the container.

In another aspect, the disclosure is directed to a lid for a container, the lid including: an insulation block having a first face and a plurality of hexagonal voids oriented orthogonal to the first face, each of the hexagonal voids having an open end at the first face; a shell covering at least the first face of the insulation block, such that the open ends of the plurality of hexagonal voids are capped by the shell; and a sealing member coupled to the lid and configured to form a seal between the lid and the when the lid is secured to the container.

In another aspect, the disclosure is directed to a container including: a container mouth; and a container lid transitionable between an attached and a detached configuration with respect to the container mouth; wherein the container lid includes: an insulation block having an upper face and a plurality of walls extending orthogonal to the upper face, the plurality of walls defining a corresponding plurality of hexagonal voids each having an open end at the upper face; an upper shell covering at least the upper face of the insulation block, such that the open ends of the plurality of hexagonal voids are capped by the upper shell; and a sealing member coupled to the lid and forming a seal between the lid and the container mouth when the lid is attached to the container mouth.

DESCRIPTION

The present disclosure may illustrate and describe a number of insulated caps in the present drawings and specification. Unless otherwise specified, the insulated cap and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar insulated caps. The following description is merely exemplary and is in no way intended to limit the disclosure, its application, or uses. Additionally, the advantages provided by the embodiments, as described below, are illustrative and not all embodiments provide the same advantages or the same degree of advantages.

Figure 1:
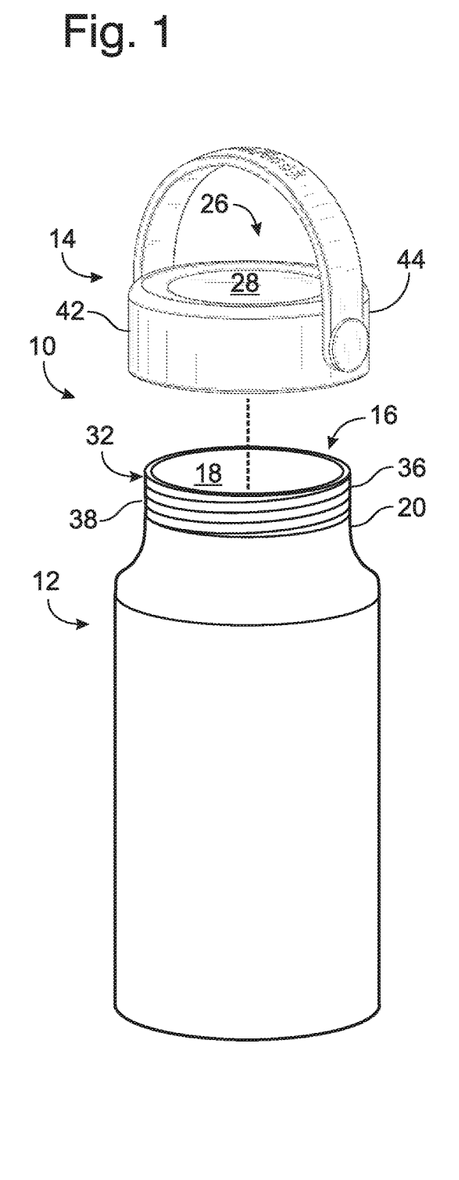
FIG. 1 is a partially exploded view of an illustrative container assembly of the present disclosure that includes an insulated cap.

FIG. 1 depicts an illustrative insulated container assembly 10 that includes an insulated container 12 and an insulated cap 14 that is complementary to the insulated container 12. The insulated cap 14 and insulated container 12 are depicted in a partially exploded view for clarity. The insulated cap 14 may be configured to be removably attachable to the associated thermally insulated container 12. The underside of insulated cap 14 is shown in FIG. 2.

The insulated container 12 may be configured to retain a desired substance, and in particular may be configured to retain the desired substance at a temperature that is either higher or lower than an ambient temperature. In one aspect of the disclosure, the insulated container 12 is configured to be used as a beverage container, and may correspond to or resemble a bottle, jug, growler, vessel, carafe, or similar beverage container. Insulated container 12 may be fashioned from any material having the desired properties for a beverage container, such as a stainless steel or a plastic formulation. The insulated container 12 may incorporate any of a variety of insulating materials, or combination of insulating materials, so as to limit the transfer of heat through the walls of the container. In one aspect of the disclosure, the insulated container 12 may incorporate a double-walled construction, with the intervening space between the walls being substantially evacuated, so that the container is a vacuum-insulated Insulated container 12 may include any suitable container configured to portably contain liquids. For example, insulated container 12 may include a bottle, jug, growler, vessel, carafe, or the like. The insulated container 12 may include a stainless steel In one aspect of the disclosure the container is fashioned from stainless steel, incorporates a double-walled construction, and is vacuum-insulated. Examples of appropriate vacuum-insulated stainless steel beverage containers for the purposes of present disclosure may be commercially available from HYDRO FLASK (Bend, The insulated container 12 may include a mouth portion 16 that provides access to an interior 18 of the insulated container 12. In some aspects, the insulated container 12 may include a mouth portion 16 that forms an opening at the distal portion of a neck 20 of the insulated container 12. The upper portion of the insulated container 12 may be defined as that portion of the insulated container 12 that includes the neck 20 and mouth portion 16 of the insulated container, consistent with the conventional and common usage when describing a container for liquids.

Figure 2:
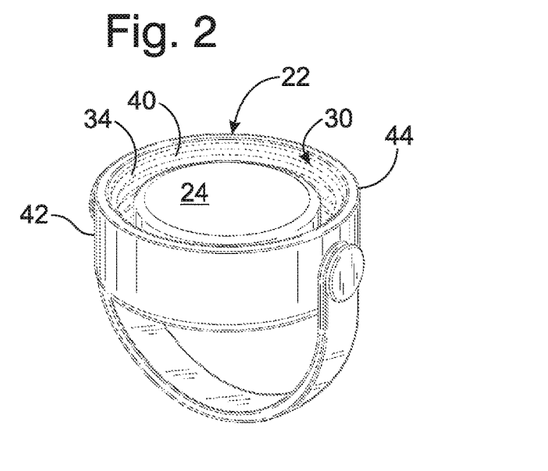
FIG. 2 is a view of the underside of the insulated cap of FIG. 1.

As may be more clearly shown in FIG. 2, the portion of the insulated cap 14 that may be configured to make contact with the mouth potion 16 and to face the interior 18 of the insulated container 12 may be referred to as the interior portion 22, or inner portion, or lower portion of the insulated cap 14, without limitation. Similarly, the surface of the insulated cap 14 that faces the interior 18 of the insulated container 12 may be referred to as an inner surface 24 of the insulated cap 14.

The portion of the insulated cap 14 that may be disposed opposite the interior portion 22 may be referred to as the exterior portion 26, the upper portion, or the outer portion of the insulated cap 14, without limitation. Similarly, the surface of the insulated cap 14 disposed opposite the inner surface 24 of the insulated cap may be referred to as the outer surface 27 of the insulated cap 14, the upper surface of the insulated cap, or the exterior surface of the insulated cap, without limitation.

The insulated cap 14 (which may alternatively be referred to as a lid) may include one or more suitable structures and components configured so as to provide a sealing closure for mouth 16 of insulated container 12. The insulated cap 14 may a first securing element 30 that is configured to secure the insulated cap 14 to the insulated container 12, such that when the insulated cap 14 is secured by securing element 30, the container assembly 10 is substantially airtight, and the contents of the container assembly 10 are substantially not prone to leaking during routine handling and/or transport. The first securing element 30 may be configured to be complementary to, and to cooperate with, a second securing element 32 disposed on or coupled to the insulated container 12.

For example, and with reference to FIG. 1, the insulated cap 14 may include a first securing element 30 that corresponds to a threading 34 that is complementary to a second securing element 32 that may include a threading 36 disposed on or adjacent to the mouth portion 16 or neck 20 of the insulated container 12. That is, threading 34 of the insulated cap 14 may be configured to mate with threading 36 of the insulated container 12, so that the insulated cap 14 may be secured to the neck 20 and thereby secured to and against mouth portion 16.

As shown in FIG. 1, for those aspects of the disclosure where the first and second securing elements may include complementary threading, the threading 36 on the insulated container 12 may be disposed on an outer surface 38 of the neck (e.g., exterior portion 26) of the insulated container 12, and the corresponding complementary threading 34 may be disposed on an inner surface 40 of a circumferential sidewall 42 of the insulated cap 14, so that threading 34 and threading 36 may positively interact to secure the insulated cap 14 to the insulated container 12.

Figure 3:
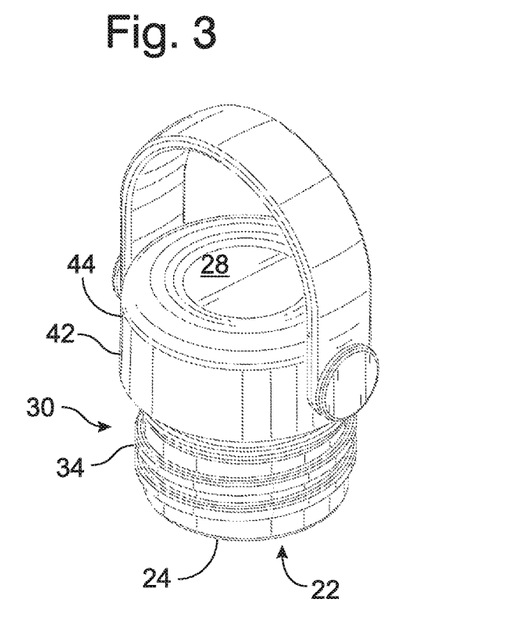
FIG. 3 is a view of an alternative and illustrative insulated cap of the present disclosure.

However, it should be appreciated that in an alternative aspect of the disclosure, the insulated container 12 may include threading 36 disposed on an inner surface of the neck 20 of the insulated container 12. In this instance, as shown in FIG. 3, the complementary cap threading 34 may be disposed on a projecting interior portion 22 of the insulating cap 14 that may be configured to be inserted at least partially into the neck 20 of the insulated container 12, such that threading 34 and threading 36 may positively interact to secure the insulated cap 14 to the insulated container 12.

Figure 4:
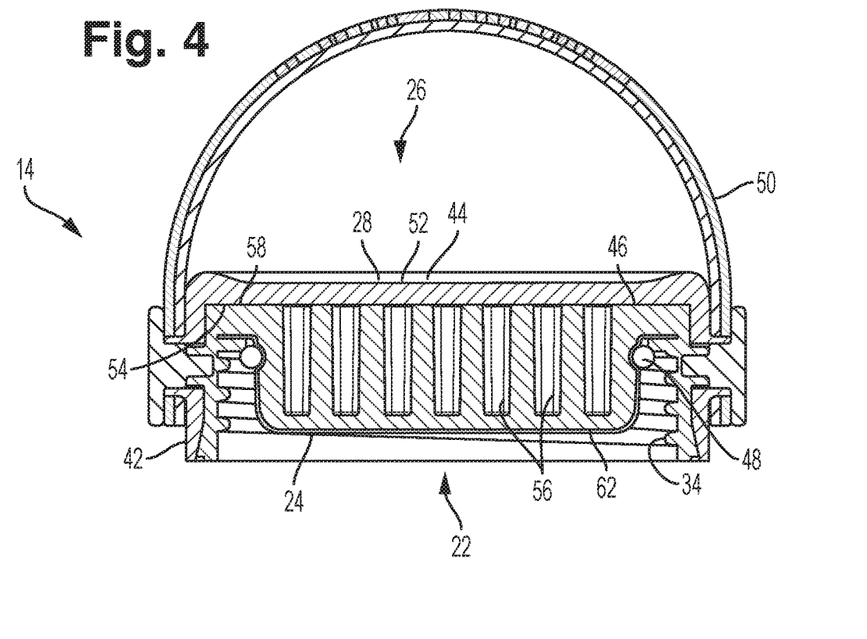
FIG. 4 is a cross-section view of the insulated cap of FIG. 1.
Figure 5:
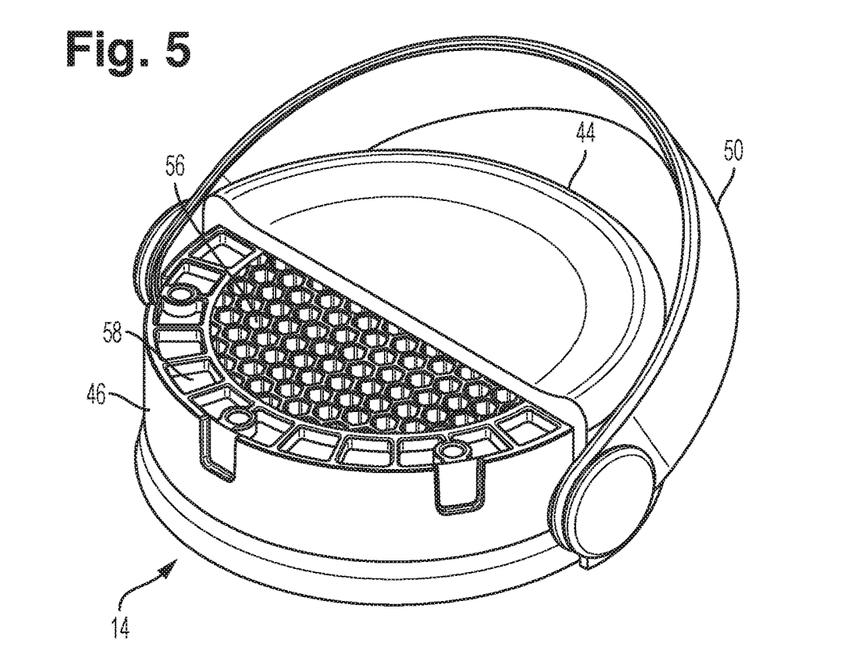
FIG. 5 is a partial cut-away view of the insulated cap of FIG. 1.
Figure 6:
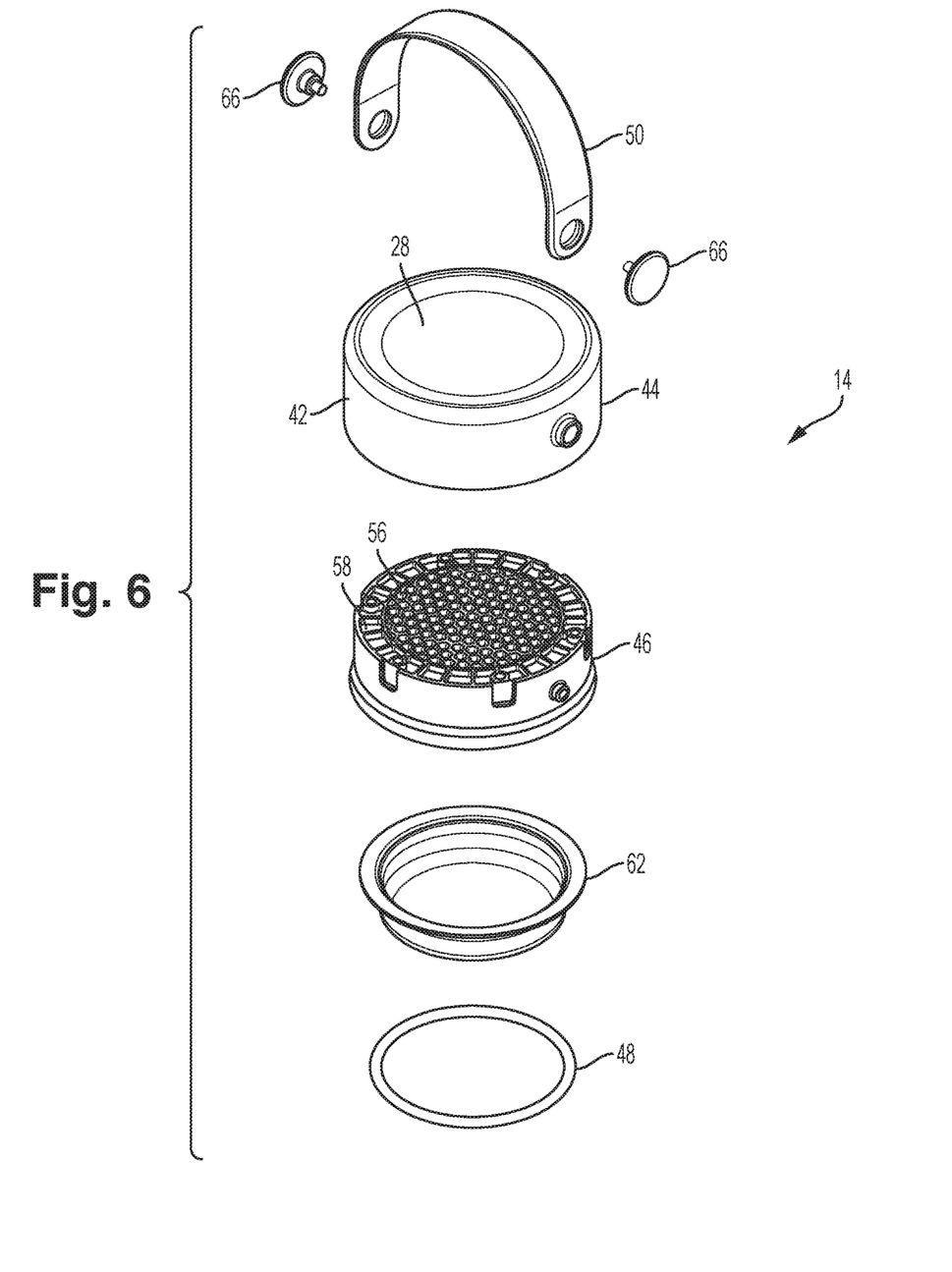
FIG. 6 is an exploded view of the insulated cap of FIG. 1.

Although insulated beverage containers having threaded couplings to their lids described herein, it should be readily apparent that a variety of additional and/or alternative configurations and conformations of securing elements may be utilized in the container assemblies of the present disclosure, and any alternative securing element or pair of securing elements that serve to secures the insulated cap 14 against the container 12 and to create a substantially airtight seal may be an appropriate securing element or elements for the purposes of this disclosure. For example, the insulated cap 14 may be retained by a securing element that includes a swing-top closure, where the insulated cap 14 may be retained by a wire bail configured so that in a first position the insulated cap 14 is retained in place against the mouth portion 16 of the insulated container 12, and a second position where the insulated cap 14 is released from contact with the insulated container 12, but the cap 14 remains connected to the container 12 the wire bail. The wire bail may be configured so that the wire bail may be manually from the first position to the second position, thereby opening the container assembly The insulated cap 14 (also referred to as a lid) may include any suitable structures and components configured to provide an insulated, releasable sealing closure for mouth 16 of insulated container 12. As shown in FIGS. 4-6, an illustrative insulated cap 14 according to the present disclosure may include an outer shell 44, an insulation block 46, and a sealing member 48. Additionally, or in the alternative, the insulated cap 14 may include a handle or carrying strap 50.

Outer shell 44 may include any suitable structure configured to provide an outer cap, shell, or housing for insulated cap 14, and may further include a grippable and/or manipulable surface configured to assist in attaching and/or detaching the insulated cap 14 from the insulated container 12. The outer shell 44 may incorporate one or more contours and/or portions or regions of texture. Alternatively, or in addition, the outer shell 44 may be molded or inscribed to provide an aesthetic, instructional, or functional interface for a user of the insulated container assembly 10. Outer shell 44 may include any suitable material having sufficient structural strength and rigidity to form the outer shell. For example, outer shell 44 may include a plastic, such as a thermoplastic, or a thermosetting polymer. In one aspect of the disclosure, the outer shell 44 incorporates a thermoplastic that is a polypropylene polymer.

In addition to structures and features disposed on an exterior surface 52 of outer shell 44, the outer shell of insulated cap 14 may also include one or more features on an interior surface that are configured to interact with one or more features of the insulated cap. For example, outer shell 44 may define apertures or through-holes that may be configured to facilitate the attachment of a carrying strap 50, and/or contours and features disposed on or formed in an inner surface 54 of the outer shell 44 that are configured to interface with insulation block 46.

Insulation block 46 may be mated with, attached to, or unitary with the inner surface 54 of outer shell 44, such that outer shell 44 substantially covers both the upper and lateral surfaces of the insulation block 46. Insulation block 46 may include any suitable insulating material or insulating structure configured to enhance the thermal insulating properties of the insulating cap 14. That is, to reduce the rate of heat transfer between the lower or inner surface 24 of the insulated cap and the upper or outer 28 of the insulated cap 14. In other words, insulation block 46 may be configured to function as a thermal barrier to heat transfer between the interior and the exterior of the insulated container 12.

Insulation block 46 may incorporate any suitable material, structure, or device configured to reduce heat transfer between the upper and lower surfaces (or the outer and inner surfaces) of the insulation block 46. For example, for example, insulation block 46 may include one or more materials that have inherently low heat transfer characteristics. In addition to having advantageous thermal properties, the materials making up insulation block 46 may be selected based upon their mechanical properties, such as being easy to form and/or machine. For example, insulation block 46 may comprise one or more plastics, such as thermosetting polymers, thermoplastics, or other polymer formulations. The insulation block 46 may include one or more plastics that may be the same or different than the plastics used for forming outer shell 44. In a selected aspect of the disclosure, the insulation block 46 may be formed from polypropylene polymer.

In addition to the incorporation of an insulating material, the insulation block 46 may be formed into a structure or shape that itself enhances the thermal insulating properties of the insulation block 46. For example, insulation block 46 may include a plurality of internal voids or apertures 56 configured so that the spaces formed by the voids 56 decrease the thermal transfer due to conduction through the material of the insulation block 46. The voids 56 may take the form of a plurality of closed cells, a of open cells, or a combination thereof. The insulation block 46 may be configured so one or more of voids 56 are filled with air, and the resulting plurality of air-spaces the insulating qualities of the insulation block 46. Alternatively, or in addition, one or of voids 56 may be filled with a gas, such as for example nitrogen, carbon dioxide, among others. In yet another aspect of the insulation block 46, one or more of voids 56 may be evacuated, so that the resulting evacuated spaces enhance the thermal insulating properties of insulation block 46.

Any appropriate number and arrangement of voids or apertures 56 may be formed in insulation block 46. In one aspect of the disclosure, the voids or apertures 56 are defined so that they are elongate voids. That is, the void extends further in one dimension than in any other dimension. Where one or more voids 56 are elongate voids, the voids may be deemed to possess a longitudinal axis.

The insulation block 46 may incorporate a plurality of elongate voids 56 that are formed so that the longitudinal axes of each of the elongate voids are substantially parallel to one another. In other words, the elongate voids 56 may be disposed so that they are substantially aligned with one another. The elongate voids 56 may be formed in insulation block 46 so that their longitudinal axes extend vertically, that is, the longitudinal axes extend between the upper and exterior portion 26 of the insulated cap 14 and the lower or interior portion 22 of the insulated cap 14.

The elongate voids may be formed in any shape or geometry that may be suitable, and that may enhance the thermal insulation of the insulated cap 14. In a selected aspect of the disclosure, each of the elongate voids has a polygonal cross-section, where the cross-section is taken at right angles to the longitudinal axis of the void, such that each includes an elongate polygonal columnar void. For example, each of the elongate voids may have a cross-section that defines a hexagon. Where the elongate voids have a hexagonal cross-section, it may be advantageous for the hexagonal voids to be formed in a close-packed array, as shown in FIG. 5, thereby forming a honeycomb pattern. This construction may minimize the amount of material needed to form the insulation block 46, as well is reducing the loss of heat through the insulation block 46 through direct conduction.

Although the voids formed in the insulation block 46 may be completely enclosed, in one aspect of the disclosure it may be advantageous to form the elongate voids 56 by forming a plurality of open-ended apertures in the upper face 58 of insulation block 46. In this way, placing the insulation block 46 within the outer shell 44 serves to cap or seal the apertures, as shown most clearly in FIGS. 4 and 5.

Insulation block 46 may be formed from any suitably non-toxic material that is substantially taste-neutral. In other words, although some materials may impart a flavor liquids they contact, a taste-neutral material does not, or does so to a much lower Where insulation block 46 is formed from a non-toxic and taste-neutral material, the or inner surface of the insulation block 46 may also serve as the lower or inner face of insulated cap 14.

Alternatively, the insulated cap 14 may further include an inner liner 62 configured to substantially isolate the interior volume of the insulated container 12 from the insulation block 46 when the insulated cap 14 is coupled to the insulated container 12, as shown in FIGS. 4 and 6. The inner liner 62 may also be non-toxic and substantially taste-neutral. Suitable inner liners 62 may be formed from, for example, stainless steel, or silicone, among others.

Where insulated cap 14 includes an inner liner 62, the inner liner may include a continuous capping structure configured to partially encase the insulation block 46, as shown in FIG. 4. In one aspect of the disclosure, the inner liner 62 may include a cap or cup that interfaces with insulation block 46 and/or outer shell 44 at an upper end of the liner 62, thereby forming a narrow annular channel into which the walls of the neck 20 of insulated container 12 may be inserted. In this way, the interior of the insulated container 12, and therefore the contents of insulated container 12, is exposed only to the inner liner 62, while the exterior of the insulated container 12 (e.g., threading 36) may contact outer shell 44 and/or insulation block 46.

The isolation of the insulation block 46 and outer shell 44 from the interior 18 of insulated container 12 may be further facilitated by the presence of sealing member 48. Sealing member 48 may include any material or structure that creates or enhances an air-tight seal between the insulated cap 14 and insulated container 12, such as a seal, a ring, a gasket, or O-ring. Although a variety of suitable shapes may be useful as a sealing member, in one aspect of the disclosure the suitable sealing member 48 may include a resilient O-ring, which may incorporate a tubular ring or solid ring having a circular cross section. The O-ring may include a silicone rubber.

The insulated cap 14 may further include a handle that is configured to facilitate carrying the insulated container assembly 10. Although any type of handle may be used to carry the insulated container assembly, it may be particularly convenient to employ a handle that includes a loop or carrying strap 50, as shown in FIGS. 1-6. Carrying strap may be coupled to the insulated cap 14 with a pivotable or a non-pivotable connection, and may include any suitable material or strap configuration adequate to support the weight of the assembled container assembly 10 when filled with a liquid. In one aspect the disclosure, carrying strap 50 may include a flat strap. Carrying strap 50 may include flexible, compliant, and/or resilient material, such as for example a flexible plastic, or silicone rubber material. The carrying strap 50 may be a single ply of material, or may incorporate one or more layers of material bound in a stack.

In one aspect of the disclosure, carrying strap 50 is pivotally connected to the outer shell 44 of the insulated cap 14, and optionally further connected to the insulation block 46 within the outer shell 44, via two pins 66. Pins 66 may be attached to the insulated cap 14 by any suitable method, such as being press-fit into appropriate apertures formed in the outer shell 44. Such apertures may include a raised boss or protrusion. Alternatively, or in addition, pins 66 may be fixed by being overmolded during manufacture of the insulated cap 14. The pins 66 may include any suitable material, such as rigid or resilient plastic or rubber, or stainless steel.

Figure 7:
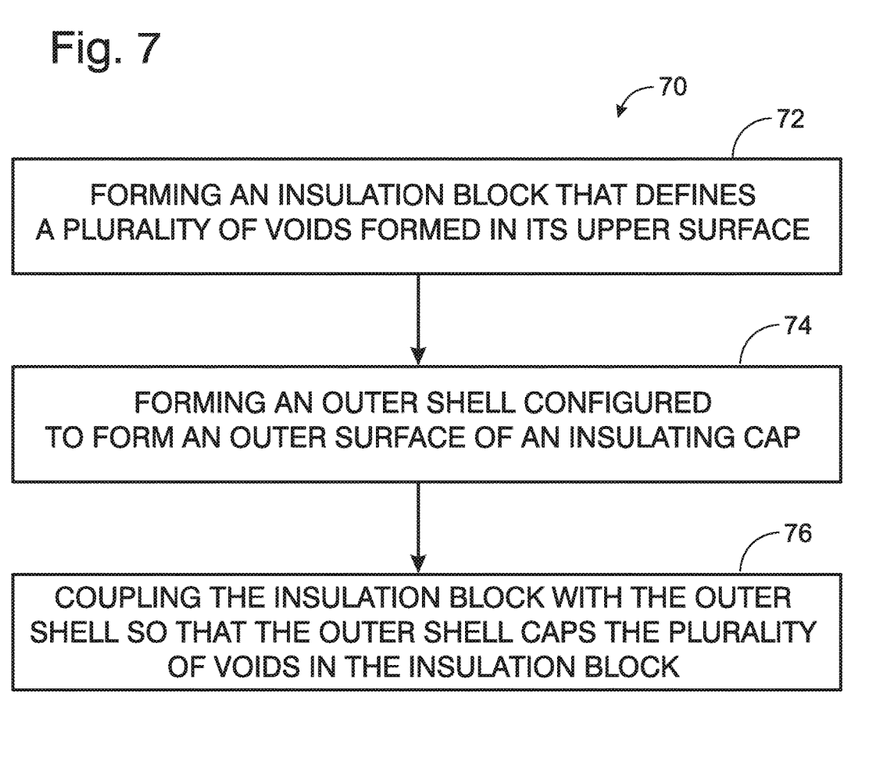
FIG. 7 is a flowchart of an illustrative method of making an insulated cap according to the present disclosure.

Carrying strap 50 may be attached relatively permanently, or may be configured so that it can be removed and/or replaced, either to repair the carrying strap or to change the colors or appearance of the container assembly. The outer shell 44 and/or pins 66 may include contours or other features that may function as detent mechanisms to releasably retain strap 50 in a desired orientation with respect to insulated cap 14. The insulated caps of the present disclosure may be manufactured as set out in flowchart 70 of FIG. 7, which includes forming an insulation block that defines a plurality of voids formed in its upper surface, at 72; forming an outer shell configured to form an outer surface of an insulating cap, at 74; and coupling the insulation block with the outer shell so that the outer shell caps the plurality of voids in the insulation block, at 76. The insulated caps 14 of the disclosure may be prepared via any suitable manufacturing method, including but not limited to spin-welding and/or over-molding processes.

CLAIM CONCEPTS AND SELECTED EMBODIMENTS

This section describes additional aspects and features of insulated caps, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer and further limit other paragraphs, providing without limitation examples of some of the suitable combinations.

A1. An insulated cap for sealing a mouth of a container, comprising:
  an outer shell;
  an insulation block disposed at least partially within the outer shell; wherein the insulation block defines a plurality of elongate voids;
  a securing element, configured to secure the cap to the container; and
  a sealing member configured to form a seal between the insulated cap and the container when the insulated cap is secured to the container by the securing element.

A2. The insulated cap of paragraph A1, wherein each of the plurality of elongate voids has a longitudinal axis, and the longitudinal axes of the plurality of elongate voids are substantially parallel.

A3. The insulated cap of paragraph A1, wherein each of the plurality of elongate voids has a longitudinal axis, and the longitudinal axes of the plurality of elongate voids are oriented substantially vertically within the insulated cap.

A4. The insulated cap of paragraph A1, wherein each of the plurality of elongate voids has a hexagonal cross-section.

A5. The insulated cap of paragraph A1, further comprising a carrying strap that is pivotally attached to the insulated cap.

A6. The insulated cap of paragraph A1, wherein the securing element includes threading that is configured to interact and mate with a complementary threading on the container.

A7. The insulated cap of paragraph A6, wherein the threading of the insulated cap is disposed on an inner surface of the insulated cap, and is configured to interact and mate with a complementary threading on an outer surface of the container.

A8. The insulated cap of paragraph A6, wherein the threading of the insulated cap is configured to interact and mate with a complementary threading on inner surface of a neck of the container.

A9. The insulated cap of paragraph A1, further comprising a taste-neutral cap liner configured such that when the insulated cap is secured to the container by the securing element the cap liner is exposed to the contents of the container B1. A container assembly, comprising:
  an insulated beverage container;
  wherein the insulated beverage container includes an inner bottle disposed within an outer bottle such that an air-tight space exists between and defined by the inner bottle and the outer bottle and the air-tight space continuously surrounds the inner bottle, a neck portion that defines a mouth of the container, and a securing element disposed on or near the neck portion; and an insulated cap;
  wherein the insulated cap includes an outer shell, an insulation block disposed at least partially within the outer shell that defines a plurality of substantially parallel elongate voids, a securing element configured to secure the insulated cap to the securing element of the container, and a sealing member configured to form a seal between the insulated cap and the insulated beverage container when the insulated cap is secured to the container by the interaction of the securing elements.

B2. The container assembly of paragraph B1, wherein each of the plurality of elongate voids has a longitudinal axis, and the longitudinal axes of the plurality of elongate voids are oriented substantially vertically within the insulated cap.

B3. The container assembly of paragraph B1, wherein each of the plurality of elongate voids has a hexagonal cross-section, and the elongate voids are disposed in a honeycomb arrangement.

B4. The container assembly of paragraph B1, wherein the securing elements of the insulated cap and the insulated beverage container are complementary portions of threading.

B5. The container assembly of paragraph B4, wherein the threading portion of the insulated beverage container is disposed on an exterior surface of a neck of the beverage container, and the threading portion of the insulated cap is disposed on an inner surface of a circumferential sidewall of the insulated cap.

B6. The container assembly of paragraph B4, wherein sealing member is an O-ring that is configured to form a seal between the insulated cap and the mouth of the container when the insulated cap is secured to the container by the interaction of the complementary portions of threading.

C1. A method of making an insulating cap, comprising:
  forming an insulation block, wherein the insulation block has an upper surface and a lower surface and defines a plurality of voids formed in the upper surface; forming an outer shell configured to form an outer surface of the insulating cap; coupling the insulation block with the outer shell such that the outer shell caps each of the plurality of cavities in the insulation block.

C2. The method of paragraph C1, further comprising pivotally coupling a carrying strap to the outer shell.

C3. The method of paragraph C1, wherein forming the insulation block includes defining a plurality of voids that are vertically elongated within the insulation block C4. The method of paragraph C1, wherein forming the insulation block includes defining a plurality of voids having hexagonal cross-sections within the insulation block.

C5. The method of paragraph C1, further comprising forming a securing element in the insulated cap, where the securing element includes threading.

C6. The method of paragraph C1, further comprising adding a sealing member that is an O-ring to the insulated cap.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of this disclosure includes all novel and nonobvious combinations and subcombinations of the various elements, features, functions, and/or properties disclosed herein. The claim concepts particularly point out certain combinations and subcombinations regarded as novel and nonobvious. Other combinations and subcombinations of features, functions, elements, and/or properties may be claimed in applications claiming priority from this or a related application. Such claims, whether directed to a different example or to the same example, and whether broader, narrower, equal, or different in scope to the original claims, also are regarded as included within the subject matter of the present disclosure. Furthermore, explicit reference is hereby made to all embodiments and examples shown in the drawings, whether or not described further herein.

What is claimed is:

1. A lid for sealing a mouth of a container, comprising:
   an outer shell;
   an insulation block disposed within the outer shell, wherein the insulation block defines a plurality of hexagonal voids; and
   a sealing member configured to form a seal between the lid and the container when the lid is secured to the container,
   wherein respective open ends of the plurality of hexagonal voids are capped by the outer shell.

2. The lid of claim 1, wherein the outer shell is plastic, the insulation block is plastic, and the hexagonal voids form a close-packed hexagonal honeycomb pattern.

3. The lid of claim 1, wherein the sealing member comprises a gasket disposed on a portion of the lid configured to extend into the mouth of the container.

4. The lid of claim 3, wherein the portion of the lid configured to extend into the mouth of the container is configured to secure the lid to the container.

5. The lid of claim 1, further comprising a manipulable structure configured to assist in transitioning the lid between a secured configuration and a detached configuration with respect to the container.

6. A lid for a container, the lid comprising:
   an insulation block having a first face and a plurality of hexagonal voids oriented orthogonal to the first face, each of the hexagonal voids having an open end at the first face;
   a shell covering at least the first face of the insulation block, such that the open ends of the plurality of hexagonal voids are capped by the shell; and
   a sealing member coupled to the lid and configured to form a seal between the lid and the container when the lid is secured to the container.

7. The lid of claim 6, wherein the sealing member comprises a gasket.

8. The lid of claim 6, further comprising a taste-neutral liner covering a second face of the insulation block.

9. The lid of claim 8, wherein the taste-neutral liner further covers a periphery of the insulation block, and the sealing member comprises a gasket disposed on the taste-neutral liner.

10. The lid of claim 6, further comprising a side wall extending around and spaced from a periphery of the insulation block, such that a gap is formed between the periphery of the insulation block and an inner surface of the side wall.

11. The lid of claim 10, wherein the side wall comprises a securing element configured to secure the lid to the container.

12. The lid of claim 11, wherein the securing element includes a first threading disposed on the inner surface of the side wall and configured to mate with a complementary second threading on the container.

13. A container comprising:
    a container mouth; and
    a container lid transitionable between an attached and a detached configuration with respect to the container mouth;
    wherein the container lid includes:
    an insulation block having an upper face and a plurality of walls extending orthogonal to the upper face, the plurality of walls defining a corresponding plurality of hexagonal voids each having an open end at the upper face;
    an upper shell covering at least the upper face of the insulation block, such that the open ends of the plurality of hexagonal voids are capped by the upper shell; and
    a sealing member coupled to the lid and forming a seal between the lid and the container mouth when the lid is attached to the container mouth.

14. The container of claim 13, wherein the sealing member comprises a gasket.

15. The container of claim 13, further comprising a taste-neutral liner covering a lower face of the insulation block.

16. The container of claim 15, wherein the taste-neutral liner further covers a periphery of the insulation block, and the sealing member comprises a gasket disposed on the taste-neutral liner.

17. The container of claim 13, further comprising a side wall extending around and spaced from a periphery of the insulation block, such that a gap is formed between the periphery of the insulation block and an inner surface of the side wall.

18. The container of claim 17, wherein the side wall comprises a securing element configured to secure the lid to the container.

19. The container of claim 18, wherein the securing element includes a first threading disposed on the inner surface of the side wall and configured to mate with a complementary second threading on the container mouth.

20. A lid for sealing a mouth of a container, comprising:
an outer shell;
an insulation block disposed within the outer shell, wherein the insulation block defines a plurality of hexagonal voids; and
a sealing member configured to form a seal between the lid and the container when the lid is secured to the container, wherein the sealing member comprises a gasket disposed on a portion of the lid configured to extend into the mouth of the container.

21. The lid of claim 20, wherein the portion of the lid configured to extend into the mouth of the container is configured to secure the lid to the container.

* * * * *